June 25, 1935.  F. M. WILLIAMSON  2,005,835
VANITY CASE
Filed July 13, 1934
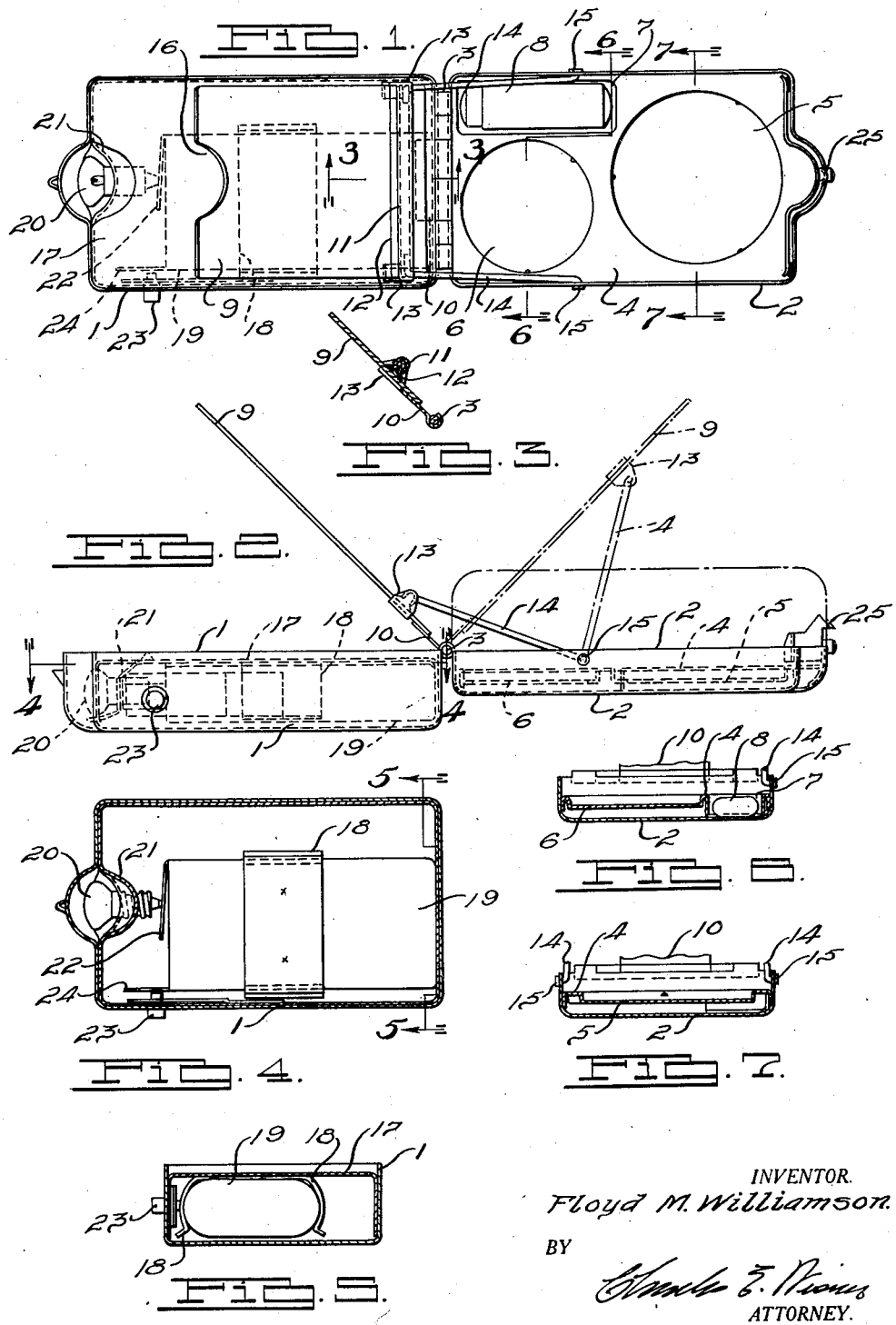
INVENTOR.
Floyd M. Williamson
BY
ATTORNEY.

Patented June 25, 1935

2,005,835

UNITED STATES PATENT OFFICE 2,005,835

VANITY CASE

Floyd M. Williamson, Detroit, Mich.

Application July 13, 1934, Serial No. 734,951

6 Claims. (Cl. 132—83)

This invention relates to vanity cases and the object of the invention is to provide a vanity case consisting of two hinged parts having a mirror pivotally mounted therebetween and provided with means whereby the mirror is wiped off as it is turned to position for use.

Another object of the invention is to provide a wiper bar connected to the casing and arranged to wipe off the face of the mirror as the mirror is turned in relation to the portion of the casing to which the wiper bar is connected.

A further object of the invention is to provide a vanity case comprising two hinged portions, one of which contains an electric light and battery and the other of which contains cosmetics and a mirror pivotally mounted between the casing halves and forming a cover for the cosmetic containing portion of the casing, the turning of the mirror to expose the cosmetics causing the face of the mirror to be automatically wiped off.

Another object of the invention is to provide a wiper bar slidable longitudinally of the mirror and connected to the casing in a manner so that turning of the mirror on its pivot causes the wiper bar to travel longitudinally thereof.

These objects and the several novel features of the invention are hereinafter more fully described and claimed and the preferred form of construction by which these objects are attained is shown in the accompanying drawing in which—

Fig. 1 is a plan view of the vanity case in the open position with the mirror between the closed and full open positions.

Fig. 2 is a side elevation of the vanity case shown in Fig. 1.

Fig. 3 is a section taken on line 3—3 of Fig. 1.
Fig. 4 is a section taken on line 4—4 of Fig. 2.
Fig. 5 is a section taken on line 5—5 of Fig. 4.
Fig. 6 is a section taken on line 6—6 of Fig. 1.
Fig. 7 is a section taken on line 7—7 of Fig. 1.

The device comprises two casing halves 1 and 2 which are hinged together on the pivot pin 3 shown in Figs. 1 and 2. The casing half 2 is provided with a sheet metal insert 4 having a recess or depression 5 for face powder, as shown in Figs. 1 and 7, and also having a recess or depression 6 for rouge, as shown in Figs. 1 and 6. A recess or depression 7 is also provided for a lipstick 8 in the metal insert 4. A polished metal mirror 9 is provided having an extension 10 extending about the hinge pin 3 so that the mirror 9 may be turned on the said hinge pin.

A mirror wiper bar 11 extends across the mirror, as shown in Figs. 1 and 3, and is provided with a felt insert 12 which engages the face of the metal mirror. A shoe 13 is provided at each end of the wiper bar 11 which rides on the edge of the mirror and a rod 14 is pivotally connected to each end of the wiper bar and to the sides of the casing 2 at the points 15. This mirror 9 may be turned to cover the portion 2 of the casing and provides a cover for the powder, rouge and lipstick compartments and the side of the mirror on which the felt insert rides is highly polished while the top edge is provided with a notch 16 into which the finger may be inserted for turning the mirror to the open position. As shown in Figs. 1, 2, 4 and 5, a metal insert 17 is positioned in the portion 1 of the casing and is provided with a battery clip 18 secured thereto in which a flashlight cell 19 may be positioned. An electric light bulb 20 is threaded through the portion 21 of the insert into contact with the terminal 22 of the flashlight cell 19 while a button 23 is provided and arranged to be moved into contact with the terminal 24 of the flashlight cell. By turning the mirror 9 to position to cover the portion 1 of the casing, the electric light bulb 20 is exposed through the notch 16 and will illuminate the face of the user while looking into the mirror when in this position.

The operation of the device will be understood more particularly from Fig. 2 in which figure it will be noted that as the mirror 9 is turned to the right to close the compartment 2, the wiper bar is pushed upwardly on the mirror to wipe the face of the mirror. If this mirror has been turned to cover the casing portion 2, the casing portion 1 may be then turned thereover to the position shown in dotted lines in Fig. 2 and the latch 25 will engage the casing half 1 and lock the two halves of the casing together. The device is usually carried in the handbag or pocket and when carried in this manner the powder or rouge gets onto the face of the mirror. However, to use the device it is merely necessary to disengage the latch 25 and turn the casing half 1 to the position shown in Fig. 2, at which time, by inserting the finger in the notch 16 of the mirror the mirror may be turned outwardly, as shown, causing the wiper bar to move downwardly the length of the mirror to wipe off the mirror and the mirror and cosmetics are then ready for use. At the same time, the light may be lighted to illuminate the face by pressing the button 23.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In a vanity case, a casing member provided with cosmetic compartments, a mirror hingedly mounted on said casing member and forming a cover for the cosmetic compartments, a wiper bar slidable longitudinally of the mirror, a rod connecting each end of the wiper bar with the casing, the arrangement being such that as the mirror is turned in relation to the casing the wiper bar is moved longitudinally of the mirror.

2. In a vanity case, a pair of casing halves hinged together, a mirror pivotally mounted on the hinge for the casing halves, a wiper bar slidable longitudinally of the mirror and carrying a felt insert riding in contact with the face of the mirror and means connecting the wiper bar with one of the casing halves whereby pivotal movement of the mirror in relation to the respective casing half causes movement of the wiper bar longitudinally of the mirror.

3. In a vanity case, a pair of casing halves hinged together at one edge, a mirror pivotally mounted on the said hinge, a wiper bar slidable longitudinally of the mirror, and means connecting the wiper bar with one of the casing halves whereby pivotal movement of the mirror on the hinge in relation to said casing half moves the wiper bar longitudinally of the mirror.

4. In a vanity case, a casing member, a mirror pivotally mounted on said casing member, a wiper bar slidable longitudinally of the mirror and means connecting the wiper bar with the casing member whereby pivotal movement of the mirror in relation to said casing member moves the wiper bar longitudinally of the mirror.

5. In an electric lighted vanity case, a pair of casing halves hinged together at one edge and respectively forming a cosmetic compartment and a battery and electric light compartment, a mirror pivotally mounted at one end between the casing halves at the hinged end and turnable to position the light reflecting face thereof over the cosmetic compartment or to position to form a cover for the battery and light compartment, the mirror having a notch at its outer end and the casing half for the battery and light having an open recess for the light at the end opposite the hinged end the wall of which extends outwardly from the casing half, the notch of the mirror when turned over the battery compartment forming with the open face of the recess an aperture through which light rays from the electric light may pass, the other casing half having a similar recess registering with the recess of the first half when the halves are closed to form a pocket for the electric light, a wiper bar slidable longitudinally of the mirror, and means whereby the turning of the mirror on its hinge moves the wiper bar longitudinally thereof to clear the light reflecting face thereof.

6. In a vanity case, a casing member having a cosmetic compartment, a mirror enclosed within the case, and means for clearing the mirror surface of cosmetic, comprising a wiper supported in position to be moved thereacross by a manual operation.

FLOYD M. WILLIAMSON.